US011676165B2

(12) United States Patent
Cho et al.

(10) Patent No.: US 11,676,165 B2
(45) Date of Patent: Jun. 13, 2023

(54) POINT SAVING SYSTEM FOR PENSION PAYMENT

(71) Applicants: Youngkyu Cho, Seoul (KR); Gilsook Jang, Chuncheon-si (KR)

(72) Inventors: Youngkyu Cho, Seoul (KR); Gilsook Jang, Chuncheon-si (KR)

(*) Notice: Subject to any disclaimer, the term of this patent is extended or adjusted under 35 U.S.C. 154(b) by 83 days.

(21) Appl. No.: 17/299,225

(22) PCT Filed: Sep. 16, 2019

(86) PCT No.: PCT/KR2019/011936
§ 371 (c)(1),
(2) Date: Jun. 2, 2021

(87) PCT Pub. No.: WO2020/116751
PCT Pub. Date: Jun. 11, 2020

(65) Prior Publication Data
US 2022/0044270 A1    Feb. 10, 2022

(30) Foreign Application Priority Data
Dec. 5, 2018 (KR) .................. 10-2018-0155065

(51) Int. Cl.
*G06Q 30/00*    (2023.01)
*G06Q 30/0207*  (2023.01)
*G06Q 50/16*    (2012.01)

(52) U.S. Cl.
CPC ..... *G06Q 30/0216* (2013.01); *G06Q 30/0236* (2013.01); *G06Q 50/167* (2013.01)

(58) Field of Classification Search
None
See application file for complete search history.

(56) References Cited

U.S. PATENT DOCUMENTS

| 2004/0267609 A1* | 12/2004 | McCauley | G06Q 30/02 705/14.35 |
| 2007/0057036 A1* | 3/2007 | Santa Cruz | G06Q 40/00 705/14.18 |

(Continued)

FOREIGN PATENT DOCUMENTS

| KR | 20080027407 A | 3/2008 |
| KR | 20110008657 A | 1/2011 |

(Continued)

OTHER PUBLICATIONS

YouTube Online Video, Nov. 14, 2018, non-official translation, MARONIE Broadcast, Consumer Pension Accumulation /Consumer Cooperative Saleblock Forum, Retrieved from <https://www.youtube.com/watch?v=loam1J2Lles> (hereinafter MARONIE YouTube Video) (Year: 2018).*

(Continued)

*Primary Examiner* — Matthew T Sittner
(74) *Attorney, Agent, or Firm* — STIP Law Group, LLC

(57) ABSTRACT

A point saving system for pension payment according to one embodiment of the present disclosure comprises: a customer terminal in which an application for customers is installed configured to make a payment by using an account that is pre-registered in the application for customers; an affiliated store terminal in which an application for affiliated stores is installed, configured to receive customer information on customers from the customer terminal, and transmit an amount of payment, together with the received customer information, to a main server; and the main server of a company configured to receive the customer information and the amount of payment from the affiliated store terminal, save points, for each customer, that correspond to a certain percentage of the received amount of payment on the basis of the received customer information, set levels of the customers on the basis of the saved points for each, deter- (Continued)

mine customers to receive a pension on the basis of the set levels and the customer information, and pay a predetermined amount of pension to each of the determined customers to receive a pension according to the set levels.

9 Claims, 2 Drawing Sheets

(56) References Cited

U.S. PATENT DOCUMENTS

| | | | |
|---|---|---|---|
| 2009/0070201 A1* | 3/2009 | Hodges | G06Q 10/04 705/26.1 |
| 2016/0283962 A1* | 9/2016 | Chan | G06Q 30/0222 |

FOREIGN PATENT DOCUMENTS

| | | |
|---|---|---|
| KR | 1026466 B1 | 4/2011 |
| KR | 20140087997 A | 7/2014 |
| KR | 20170028567 A | 3/2017 |
| KR | WO2017175488 A1 | 10/2017 |

OTHER PUBLICATIONS

International Search Report of PCT/KR2019/011936, dated Mar. 12, 2020, English translation.

YouTube Online Video, Nov. 14, 2018, non-official translation, MARONIE Broadcast, Consumer Pension Accumulation / Consumer Cooperative Saleblock Forum, Retrieved from <https://www.youtube.com/watch?v=loam1J2Lles>.

* cited by examiner

US 11,676,165 B2

POINT SAVING SYSTEM FOR PENSION PAYMENT

CROSS-REFERENCE TO RELATED APPLICATIONS

This application is the U.S. National Phase under 35 U.S.C. § 371 of International Application No. PCT/KR2019/011936 filed on Sep. 16, 2019, which in turn claims the benefit of Korean Application No. 10-2018-0155065 filed on Dec. 5, 2018, the disclosures of which are incorporated by reference into the present application.

TECHNICAL FIELD

The present disclosure relates to a point saving system for pension payment, and particularly to a point saving system for pension payment, which accumulates a part of a fee that customers settle with points, and pays the accumulated points as a pension when satisfying a fixed condition.

BACKGROUND ART

Recently, a variety of old age security policies are being demanded according to population aging, instability of old-age income security, and the limitation of old age security of a national pension system.

Accordingly, a large number of individuals have enrolled in different types of pension plans, such as the national pension plan or a retirement pension plan, and have paid a certain amount of money on a monthly basis, but although they substantially pay considerable expense monthly, they are still feeling the lack of security for the aged.

Meanwhile, by reason of various benefits such as income tax deduction for credit card bills when adjusting tax payments at the end of the year and transparency in income of the self-employed, as the Government has been promoting card using, plenty of individuals tend to increase their card using yearly.

Therefore, there are a variety of ways capable of accumulating points according to the card using, and utilizing the accumulated points.

A conventional art has been disclosed to provide a method for depositing and using points according to use of credit cards capable of conveniently depositing and utilizing points without needing to suggest loyalty cards to a counter clerk for the purpose of depositing or utilizing the points at the time of using the credit cards (see Patent Literature 1).

Further, a restoration system and method of accumulation points of loyalty credits has been disclosed which can request restoration for money or points accumulated in customers' loyalty cards, by using a mobile communication terminal and directly transfer the accumulated money or the accumulated points to a virtual account (see Patent Literature 2).

As described above, there are a few ways to accumulate points for costumers' consumption and utilize the accumulated points, but there is a need for developing technologies to protect the rights and interests of consumers and solve pervasive social problems for old age planning, by paying the accumulated points as a pension, as a part of old age security policies.

PRIOR ART

Patent Literature (Patent Literature 0001) KR20170028567A
(Patent Literature 0002) KR1026466B1

DISCLOSURE OF THE INVENTION

Technical Problem

The present disclosure has been made to solve the aforementioned problem occurring in the prior art, and it is an object of the present disclosure to provide a point saving system for pension payment which calculates points accumulated for each customer and pays accumulated points as a pension when satisfying a fixed condition, thus providing a reward corresponding to customers' consumption.

Technical Solution

A point saving system for pension payment according to one embodiment of the present disclosure may comprise: a customer terminal in which an application for customers is installed, configured to make a payment by using an account that is pre-registered in the installed application for customers; an affiliated store terminal in which an application for affiliated stores is installed, configured to receive customer information from the customer terminal, and transmit an amount of payment, together with the received customer information, to the main server; and a main server of a company configured to receive the customer information and the amount of payment from the affiliated store terminal, save points, for each customer, which correspond to a certain percentage of the received amount of payment on the basis of the received customer information, set levels of the customers on the basis of the saved points for each customer, determine customers to receive a pension on the basis of the set levels and the customer information, and pay a predetermined amount of pension to each of the determined customers to receive a pension according to the set levels.

The customer terminal may transmit an information request for the set levels and accumulated points, to the main server.

The main server may transmit information for the set levels and accumulated points, to the customer terminal.

The customer terminal may select one from pension payment or deferred pension payment, if the set levels and the accumulated points match a predetermined condition of receiving a pension.

The customer terminal may request the pension payment to the main server, if the pension payment is selected.

The main server may determine customers that request the pension payment, as the customers to receive a pension, and pay, as a pension, a predetermined amount of money in the set levels to the customers to receive a pension, to the account that is pre-registered in the application for customers by the customers to receive the pension, if an age of the customer to receive the pension matches a standard age set in the set level.

The main server may initialize points accumulated to the customers to receive a pension.

The customer terminal may request the deferred pension payment to the main server, if the deferred pension payment is selected.

The main server may determine customers that defer receiving the pension, as deferred-payment customers, and accumulate points of the deferred-payment customers, until the pension payment is requested from the customer terminals of the deferred-payment customers.

The main server may renew the set levels to the deferred-payment customers on the basis of the accumulated points.

The main server may determine, as customers meeting standard levels, customers staying for a certain period of time after the application for customers was installed in the customer terminal, or member subscription was performed.

The customer terminal may request distribution of land to the main server.

The main sever may determine, as land distribution customers, customers requesting the distribution of land, if the customers requesting the distribution of land meet the customers meeting standard levels, and land owned by the company may be segmented by land corresponding to the accumulated points to the land distribution customers, and shares of the segmented land may be assigned to the land distribution customers.

The main server may request a land ownership change to an external server such that land ownership of the land assigned to the land distribution customers is changed to become under joint names of the land distribution customers and the company.

The main server may initialize the points accumulated to the land distribution customers.

The main server may determine, as donation customers, customers donating real estate and movable assets, if the real estate and the movable assets are donated to the company from customers, and may calculate the donated real estate and the donated movable assets by an amount of money and accumulate points corresponding to the calculated amount of money, to the donation customers.

Advantageous Effects

According to a point saving system for pension payment according to one embodiment of the present disclosure, there is an advantage of providing a reward corresponding to customers' consumption by accumulating a part of a fee that customers settle with points, and paying accumulated points as a pension when satisfying a fixed condition.

Further, there is a public advantage of protecting the rights and interests of consumers by paying, with a pension, the reward for consumption.

Furthermore, the present disclosure may help to encourage donation and set up a preferred donation culture, by accumulating the points corresponding to the value of real estate and the donated movable assets that the customers donated.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the invention. In the drawings.

DETAILED DESCRIPTION OF THE PREFERRED EMBODIMENTS

In the specification, terms "first" and/or "second" are only used to distinguish one element from another. That is, the elements are not to be limited by the terms.

Elements, features, and steps mentioned to be "included" in the specification mean presence of the elements, features, and steps, and do not exclude one or more other elements, features, and steps and the equivalents.

The singular form is intended to also include the plural form, unless the context clearly indicates otherwise. That is, the elements mentioned in the specification may mean presence or addition of one or more other elements or the like.

Unless otherwise defined, all terms including technical or scientific terms used in the present disclosure have meanings the same as those of terms generally understood by those skilled in the art.

That is, it will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a point saving system for pension payment same will be described in detail with reference to the accompanying drawings.

Figure 1:
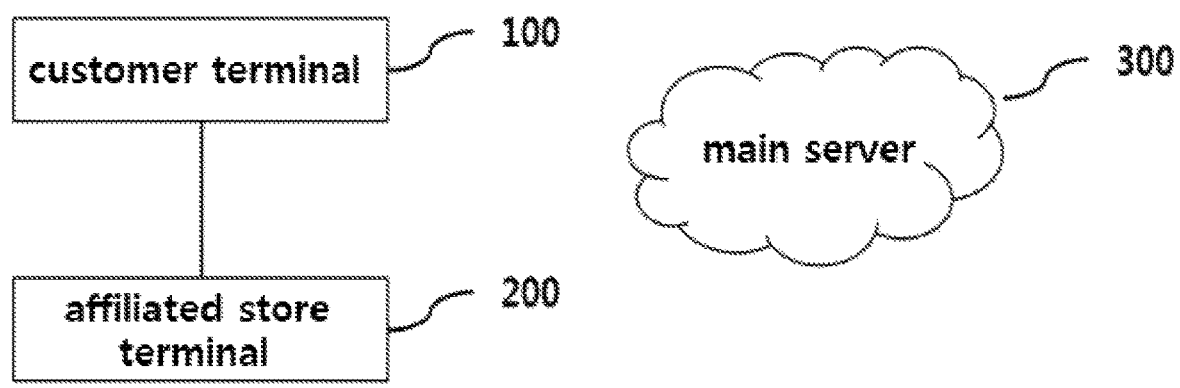
FIG. 1 is a block diagram simply showing a point saving system for pending payment according to one embodiment of the present disclosure.

FIG. 1 is a block diagram simply showing a point saving system for pending payment according to one embodiment of the present disclosure.

With reference to FIG. 1, the point saving system for pending payment according to one embodiment of the present disclosure may comprise a customer terminal 100, an affiliated store terminal 200 and a main server 300.

In the customer terminal 100, an application for customers is installed, and the customer terminal 100 may make a payment by using an account that is pre-registered in the installed application for customers.

For example, the customer terminal 100 may include a terminal such as a smartphone, a tablet PC or the like, in which an application can be installed.

A customer may install the application for customers in the customer terminal 100, and register an account for payment in the application for customers.

For example, when the customer executes the application for customers to make a payment in the customer terminal 100, the customer terminal 100 may output a payment standby screen including a bar code or a QR code. The customer may proceed to make a payment by getting the payment standby screen output to the customer terminal 100 to be recognized to a scanner provided in the affiliated store terminal 200.

In the affiliated store terminal 200, an application for affiliated stores is installed, the affiliated store terminal 200 may receive customer information from the customer terminal 100 that made a payment, and transmit an amount of payment, together with the received customer information, to the main server 300.

For example, the affiliated store terminal 200 is a point of sales (POS) device in which the application for affiliated stores can be installed, and the affiliated store terminal 200 may include the scanner that can recognize the bar code or the QR code included in the payment standby screen output from the customer terminal 100.

The main server 300 is a block chain server, and may receive the customer information and the amount of payment from the affiliated store terminal 200, save points, for each customer, which correspond to a certain percentage of the received amount of payment on the basis of the received customer information, set levels of the customers on the basis of the saved points for each customer, determine customers to receive a pension on the basis of the set levels and the customer information, and pay a predetermined amount of pension to each of the determined customers to receive a pension according to the set levels.

The affiliated stores may be opened not only in South Korea but also abroad, and the costumer may make a payment through the application for customers even abroad. In this case, an amount of payment may be withdrawn from an account that is pre-registered in the application for costumers and a part of the amount of payment may be accumulated with points.

For example, when an A customer purchases an object that costs 1,000 yen via the application for customers in Japan, the Korean won corresponding 1,000 yen may be withdrawn from the pre-registered account, and a part of 1,000 yen as an amount of payment may be accumulated with points. In other words, the Korean won corresponding to 1,000 won may be withdrawn from the pre-registered account and be converted into coins or tokens, and the converted coins or tokens may be converted into 1,000 yen for making a payment.

That is, according to one embodiment of the present disclosure, the customers can be sufficiently rewarded for their consumption by accumulating the costumers' points for both domestic and oversee consumption. Further, since a currency swap can be performed without having to go through a card company or a bank, the customers can reduce a fee caused by the currency swap.

The main server 300 may receive the information of the customers that made a payment and the amount of payment from the affiliated store terminal 200 shortly after making a payment. In other words, since the bar code or the QR code included in the payment standby screen output from the customer terminal 100 includes the customer information, the affiliated store terminal 200 may extract the customer information from the customer terminal 100, and transmit the extracted customer information and the amount of payment to the main server 300.

As the main server 300 is a customer management server, it may accumulate the points corresponding to a certain percentage of the received amount of payment.

For example, the main server 300 may accumulate 3 percent of the amount of payment with points, and 1 point may correspond to 1 won. The amount of money corresponding to the accumulated points may be transferred to a bank, and the amount of money transferred to the bank may be utilized for paying and managing the pension.

The main server 300 may calculate a period of use of the application of customers, for each customer, on the basis of a time when the application of customers was installed in the customer terminal 100, or a time of becoming a member of the application of customers.

The main server 300 may transmit information for the set levels and the accumulated points to the customer terminal 100 of the determined customer.

The main server may set a level of the determined customer based on the accumulated points. For example, the main server 300 may set a level of customers having the accumulated points from 10 million or more to less than 20 million to a first level, set a level of customers having the accumulated points from 20 million or more to less than 30 million to a second level, set a level of customers having the accumulated points from 30 million or more to less than 40 million to a third level, and set a level of customers having the accumulated points of 40 million or more to a fourth level.

The costumer terminal 100 may receive information for the set levels and the accumulated points from the main server 300, and may select one from pension payment or deferred pension payment by the customer, if the set levels and the accumulated points match a predetermined condition of receiving a pension.

The customer terminal 100 may request the pension payment to the main server 300, if the pension payment is selected. The main server 300 may determine customers that request the pension payment, as the customers to receive the pension, and pay, as the pension, a predetermined amount of money in the set levels to the customers to receive a pension, to the account that is pre-registered in the application for customers by the customers to receive a pension, if an age of the customer to receive the pension matches a standard age set in the set level.

For example, if the set level is the first level, namely, the accumulated points are from 10 million or more to less than 20 million, the customer may select the pension payment or the deferred pension payment.

The customer may select the pension payment to receive, as the pension, the predetermined amount of money in the set level according to the accumulated points until now.

For example, in the first level, a total of 10 million won may be paid as the pension to the customers aged 55 or older for 10 years; in the second level, a total of 20 million won may be paid as the pension to the customers aged 57 or older for 11 years; in the third level, a total of 30 million won may be paid as the pension to the customers aged 60 or older for 12 years; and in the fourth level, a total of 40 million won may be paid as the pension to the customers aged 65 or older for 13 years.

If the customer of which the level is set to the first level selects the pension payment, the pension may be paid when the customer is 55 years old.

In other words, the point saving system for pension payment according to one embodiment of the present disclosure may provide a reward corresponding to consumption patters of the customers, by differently setting an amount of pension payment, a payment beginning time and a payment period according to the set levels.

The customer's selection of deferring pension payment is for increasing his or her set level by additionally accumulating the points, and if the deferred pension payment is selected, the customer terminal 100 may request the deferred pension payment to the main server 300.

The main server 300 may determine customers that defer receiving the pension, as deferred-payment customers, and accumulate the points of the deferred-payment customers until receiving a payment request of the pension from the customer terminal of the deferred-payment customers.

For example, if the customers having 10 million accumulated points selects the deferred pension payment and accumulates 10 million points additionally, the main server 300 may renew the level of the corresponding customer from the first level to the second level.

The deferred-payment customers can select the pension payment at any time in the customer terminal 100, and the customer terminal 100 may request the pension payment to the main server 300 shortly after the pension payment is selected. The main server 300 may determine the deferred-payment customer that requests the pension payment, as the customer to receive a pension, and pay the pension according to the set levels.

The main server 300 may pay the pension to the customers to receive a pension, and initialize the points accumulated to the customers to receive a pension. In other words, the customers to receive a pension may receive the pension by consuming the accumulated points, and accumulate the points from zero again.

The main server 300 may determine, as customers meeting standard levels, customers staying for a certain period of time after the application for customers was installed in the customer terminal, or member subscription was performed. For example, the main server 300 may determine, as the customers meeting standard levels, customers that use the application for customers for 3 years, among all customers.

The customers meeting standard levels may request distribution of land that a company owns, to the main server 300 via the customer terminal 100. The land that the company owns may include overseas land including any one of state-owned land, idle land and undeveloped land.

The main sever 300 may determines, as land distribution customers, customers requesting the distribution of land, if the customers requesting the distribution of land meet the customers meeting standard levels, and the land owned by the company may be segmented by land corresponding to the accumulated points to land distribution customers, and shares of the segmented land may be assigned to the land distribution customers.

The main server 300 may request a land ownership change to an external server such that land ownership of the land assigned to the land distribution customers are changed to become under joint names of the land distribution customers and the company.

The main server 300 may initialize the points accumulated to the land distribution customers. In other words, if the customers use the application for customers for 3 years, they are entitled to request the distribution of land that the company owns.

For example, if the customers meeting standard levels that have used the application for customers for 3 years request the distribution of land, they may consume the points accumulated in that period and be assigned land corresponding to the consumed points. Then, the customers may accumulate the points from zero.

On the contrary, if the customers meeting standard levels fail to request the distribution of land, they may lose the right of the request for the distribution of land, and keep accumulating the points.

In other words, the point saving system for pension payment according to one embodiment of the present disclosure, there is an advantage of providing the reward for the consumption by accumulating a part of the amount that the customers paid, with the points of the customers.

Moreover, the customers meeting standard levels that have used the application for customers for 3 years may be entitled to request the distribution of land that the company owns. Hence, the opportunity to own the overseas land may be given to the customers meeting standard levels, resulting in offering assistance to have a multinational lifestyle.

For example, the state-owned land usually left unattended unless there are special circumstances, or derelict land such as undeveloped wilderness and the like may be assigned to the customers requesting the distribution of land, and then, the distributed land may be switched into a low-carbon farm via land reclamation. The switching of the derelict land to available land can lead to offering greatly social assistance in environmental aspects, helping to provide for the customers' old age after retirement, and providing a means of investment techniques.

The customers may accumulate the points via donation as well as the payment. In other words, the customers may donate real estate and movable assets to the company, the main server 300 may calculate the donated real estate or the donated movable assets by an amount of money, and points corresponding to the calculated amount of money may be accumulated to the donation customers.

For example, if an A customer of which the level is set to the first level by accumulating 15 million points donates 15 million won, the main server 300 may renew the A customer's level from the first level to the third level. In this case, if the A customer requests the pension payment, the A customer can receive the pension corresponding to the predetermined amount of money in the third level.

Currently, the donation is to give money, objects or the like, for nothing, in order to help a charity or public work, and there is no reward returned to donators. Therefore, the present disclosure may help to encourage donation and set up a preferred donation culture by paying the pension as a reward for donation.

Figure 2:
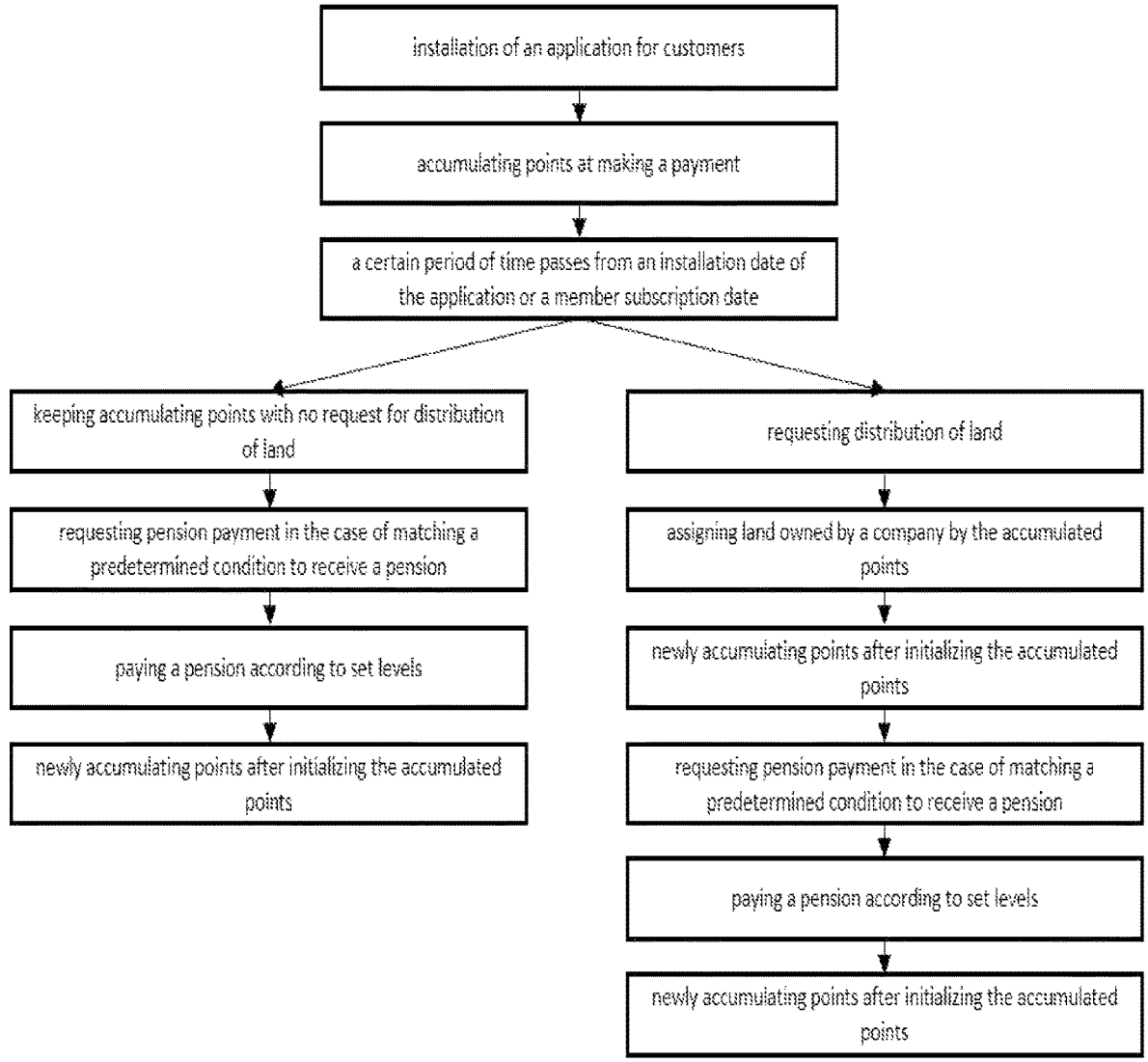
FIG. 2 is a view showing an example performed in a point saving system for pending payment according to one embodiment of the present disclosure.

FIG. 2 is a view showing an example performed in a point saving system for pending payment according to one embodiment of the present disclosure.

With reference to FIG. 2, the customers staying for a certain period of time, for example, for 3 years, from an installation date of the application for customers or a member subscription date may be entitled to request the distribution of land.

If the customers request the distribution of land via the customer terminal 100, the main server 300 may assign the customers the land corresponding to the points that the customers accumulated, among the land that the company owns. At this time, the ownership of the assigned land may be shared on a fifty-fifty basis between the company and the customers.

That is, the customers may consume the accumulated points and be assigned the land corresponding to the consumed points. The points of the customers assigned the land may be initialized to zero, and the customers may newly accumulate the point from zero.

The customers may request the pension payment, if the accumulated points match a predetermined condition of receiving a pension. The main server 300 may pay the pension according to the set levels to the customers, and initialize the points accumulated to the customers to zero. In other words, the customers may consume the accumulated points to receive the consumed points as the pension.

If the customers fail to request the distribution of land, the customers may lose the right to request the distribution of land, and receive the accumulated points as only the pension by consuming the accumulated points. Furthermore, in the process, the customers may donate real estate and movable assets to the company, and accumulate the points corresponding to the calculated donation.

Moreover, the customers may increase their set levels by accumulating the points via the donation in addition to point accumulation with consumption.

The point saving system for pension payment according to one embodiment of the present disclosure has a public object to provide a reward for the consumers' spending lifestyle by giving the customers the reward for spending via the distribution of land and the pension payment.

Descriptions in the specification are shown as some examples but may be variously changed or modified by the scope defined by claims which will be described below, and the technical scope of the present disclosure should be defined by the claims.
100: customer terminal
200: affiliated store terminal
300: main server

The invention claimed is:

1. A point saving system for pension payment comprising:
a customer terminal, an affiliated store terminal, and a main server,
wherein,
the customer terminal comprising an application for customers, is configured to make a payment by using an account that is pre-registered in the application for customers;
the affiliated store terminal comprising an application for affiliated stores, is configured to receive customer information from the customer terminal, and transmit an amount of payment, together with the received customer information, to the main server; and
the main server of a company is configured to receive the customer information and the amount of payment from the affiliated store terminal, save points, for each customer, which correspond to a certain percentage of the received amount of payment on the basis of the received customer information, set levels of the customers on the basis of the saved points for each customer, determine customers to receive a pension on the basis of the set levels and the customer information, and pay a predetermined amount of pension as a reward of customer's consumption to each of the determined customers to receive a pension according to the set levels,
wherein the customer terminal is further configured to select one from pension payment or deferred pension payment, if the set levels and the accumulated points match a predetermined condition of receiving a pension,
wherein the main server is further configured to determine, as customers meeting standard levels, customers staying for a certain period of time after the application for customers was installed in the customer terminal, or member subscription was performed, and
wherein, the customer terminal is further configured to request a distribution of land owned by the company of the company to the main server,
the main sever is further configured to determine, as land distribution customers, customers requesting the distribution of land, if the customers requesting distribution of the land meet the customers meeting standard levels, and
the land is segmented by land corresponding to the accumulated points to land distribution customers, and shares of the segmented land are assigned to the land distribution customers.

2. The point saving system for pension payment of claim 1, wherein the customer terminal transmits an information request for the set levels and accumulated points, to the main server, and
the main server transmits information for the set levels and accumulated points, to the customer terminal.

3. The point saving system for pension payment of claim 1, wherein the customer terminal requests the pension payment to the main server, if the pension payment is selected, and
the main server determines customers that request the pension payment, as the customers to receive the pension, and pays, as a pension, a predetermined amount of money in the set levels to the customers to receive a pension, to the account that is pre-registered in the application for customers by the customers to receive a pension, if an age of the customer to receive a pension matches a standard age set in the set level.

4. The point saving system for pension payment of claim 3, wherein the main server initializes the points accumulated to the customers to receive a pension.

5. The point saving system for pension payment of claim 1, wherein the customer terminal requests the deferred pension payment to the main server, if the deferred pension payment is selected, and
the main server determines customers that defer receiving the pension, as deferred-payment customers, and accumulates points of the deferred-payment customers, until the pension payment is requested from the customer terminals of the deferred-payment customers.

6. The point saving system for pension payment of claim 5, wherein the main server renews the set levels to the deferred-payment customers on the basis of the accumulated points.

7. The point saving system for pension payment of claim 1, wherein the main server requests a land ownership change to an external server such that land ownership of the land assigned to the land distribution customers are changed to become under joint names of the land distribution customers and the company.

8. The point saving system for pension payment of claim 1, wherein the main server initializes the points accumulated to the land distribution customers.

9. The point saving system for pension payment of claim 1, wherein the main server determines, as donation customers, customers donating real estate and movable assets, if the real estate and the movable assets are donated to the company from customers, and calculates the donated real estate or the donated movable assets by an amount of money and accumulates points corresponding to the calculated amount of money, to the donation customers.

\* \* \* \* \*